US009133631B2

(12) United States Patent
Jungklaus et al.

(10) Patent No.: US 9,133,631 B2
(45) Date of Patent: Sep. 15, 2015

(54) HANDLE SYSTEM FOR FINISHING TOOL

(75) Inventors: Matthew W. Jungklaus, Lawrenceville, GA (US); David J. Castagnetta, Maple Grove, MN (US); Charles C. Somers, III, Snellville, GA (US); Christopher A. Lins, Crystal, MN (US); Jeromy D. Horning, Albertville, MN (US); Bret A. Deneson, Otsego, MN (US); Steve J. Wrobel, Rogers, MN (US)

(73) Assignees: AXIA ACQUISITION CORPORATION, Duluth, GA (US); GRACO INC., Minneapolis, MN (US)

( * ) Notice: Subject to any disclaimer, the term of this patent is extended or adjusted under 35 U.S.C. 154(b) by 503 days.

(21) Appl. No.: 13/151,180

(22) Filed: Jun. 1, 2011

(65) Prior Publication Data

US 2011/0297326 A1 Dec. 8, 2011

Related U.S. Application Data

(60) Provisional application No. 61/350,361, filed on Jun. 1, 2010.

(51) Int. Cl.
*B32B 37/00* (2006.01)
*E04F 21/06* (2006.01)
(Continued)

(52) U.S. Cl.
CPC . *E04F 21/06* (2013.01); *B25G 1/10* (2013.01); *B25G 3/38* (2013.01); *B29C 66/861* (2013.01); *E04F 21/165* (2013.01); *Y10T 29/49826* (2015.01); *Y10T 156/17* (2015.01)

(58) Field of Classification Search
CPC .......... E04F 21/165; E04F 21/06; B25G 1/10; B25G 3/38; B29C 66/861; B29C 66/8612

USPC .............. 156/574, 577, 578, 579; 401/5, 138, 401/139, 140
See application file for complete search history.

(56) References Cited

U.S. PATENT DOCUMENTS 2,862,382 A 12/1958 Ames
3,070,827 A 1/1963 Ames
(Continued)

FOREIGN PATENT DOCUMENTS

CA 2018937 A1 1/1991
EP 0 461 873 A2 12/1991

OTHER PUBLICATIONS

Tapetech Tool Company, Inc., Automatic Drywall Taping & Finishing Tools, Oct. 27, 2010, www.tapetech.com.

*Primary Examiner* — James Sells
(74) *Attorney, Agent, or Firm* — Michael Best & Friedrich LLP

(57) ABSTRACT

The present disclosure describes a handle system for use with finishing tools utilized to finish wallboard joints. A finishing tool may be connected to the handle system and moved relative to a wallboard joint to appropriately apply mastic over the joint. In one embodiment, the handle system includes an elongate handle body having a tear drop cross-sectional shape. The shape enables the handle body to fit ergonomically within a user's hand and improves the user's ability to resist torque tending to cause the handle body to twist and a connected finishing tool to come out of contact with wallboard during use. The handle system further includes a pivoting connector assembly that permits a connected finishing tool to rotate relative to the handle body and that has a unique pivot pin that allows mastic to flow through the handle body, through the pivoting connector assembly, and into the connected finishing tool.

17 Claims, 9 Drawing Sheets

(51) Int. Cl.
  *B29C 65/00* (2006.01)
  *B25G 1/10* (2006.01)
  *B25G 3/38* (2006.01)
  *E04F 21/165* (2006.01)

(56) References Cited

U.S. PATENT DOCUMENTS

| | | | |
|---|---|---|---|
| 3,090,653 A * | 5/1963 | Stump | 403/248 |
| 3,103,033 A | 9/1963 | Ames | |
| 3,707,427 A | 12/1972 | Erickson | |
| 4,452,663 A | 6/1984 | Heaton | |
| 5,099,539 A | 3/1992 | Forester | |
| 5,169,252 A | 12/1992 | Chappell | |
| 5,279,700 A | 1/1994 | Retti | |
| 5,346,504 A | 9/1994 | Ortiz et al. | |
| 5,368,461 A | 11/1994 | Murphy | |
| 5,863,146 A | 1/1999 | Denkins et al. | |
| 5,882,691 A | 3/1999 | Conboy | |
| 5,902,451 A | 5/1999 | O'Mara et al. | |
| 6,142,918 A * | 11/2000 | Liu | 482/108 |
| 6,484,782 B1 | 11/2002 | Lewis et al. | |
| 6,793,428 B2 | 9/2004 | Lithgow | |
| 6,874,965 B1 * | 4/2005 | Mondloch et al. | 401/5 |
| 7,114,869 B2 | 10/2006 | MacMillan | |
| 7,621,309 B1 | 11/2009 | Mondloch et al. | |
| 7,628,295 B2 * | 12/2009 | Mondloch et al. | 222/397 |
| 7,674,059 B2 | 3/2010 | Daigle | |
| 7,806,613 B2 | 10/2010 | Mondloch et al. | |
| 2002/0124353 A1* | 9/2002 | Holland-Letz | 16/430 |
| 2003/0024074 A1 | 2/2003 | Hartman | |
| 2005/0100386 A1* | 5/2005 | Murray | 401/5 |
| 2005/0193511 A1* | 9/2005 | St. James et al. | 15/144.4 |
| 2006/0026800 A1* | 2/2006 | Lawless | 16/430 |
| 2006/0230564 A1* | 10/2006 | Jungklaus et al. | 15/144.4 |

* cited by examiner

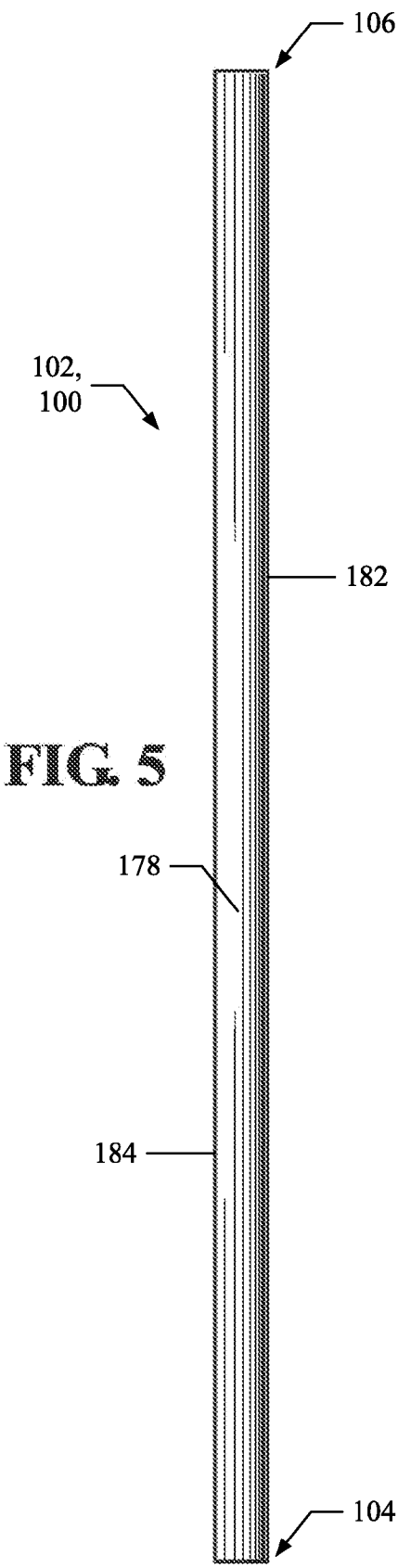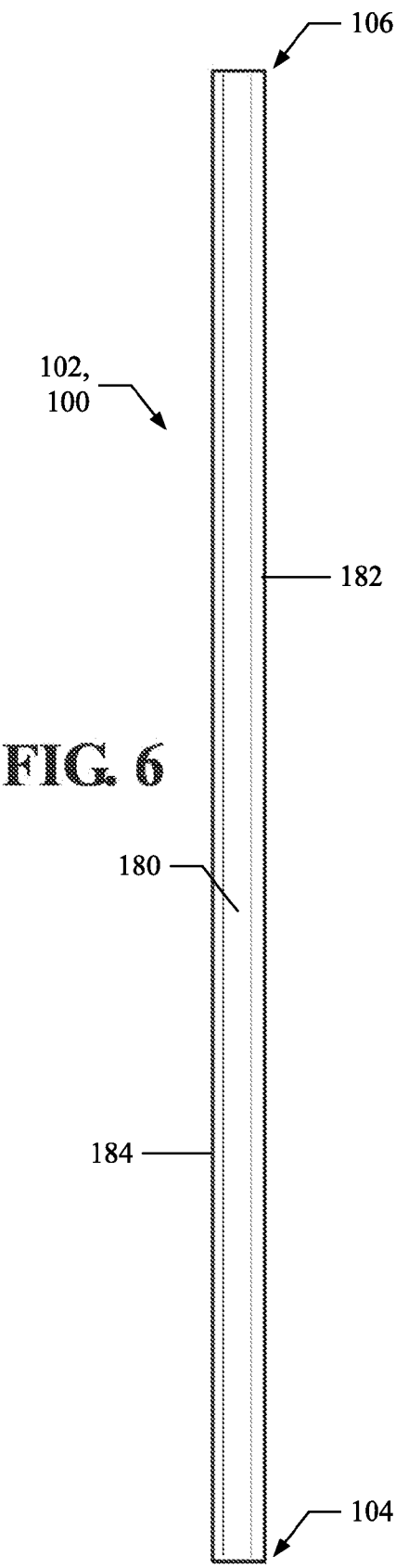

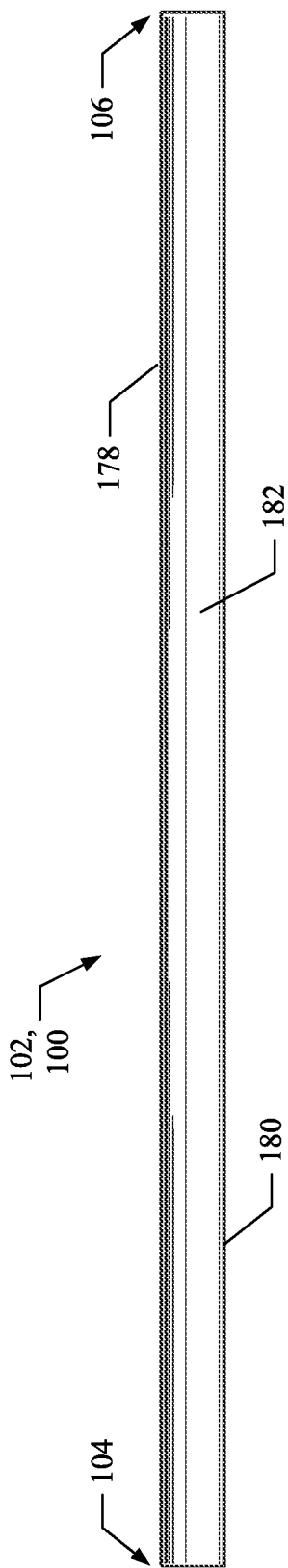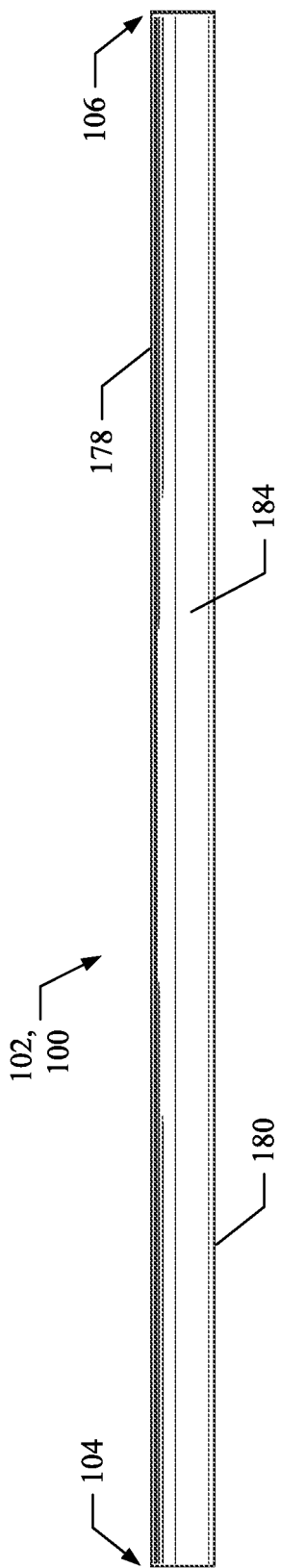

HANDLE SYSTEM FOR FINISHING TOOL

CROSS REFERENCE TO RELATED APPLICATION

This application claims the benefit of U.S. Provisional Application No. 61/350,361, filed Jun. 1, 2010.

FIELD OF THE INVENTION

The present invention relates, generally, to the field of tools for finishing gaps, seams, or joints between construction materials.

BACKGROUND

Today, many construction materials come in the form of substantially planar panels or rolls which are unrollable into, essentially, planar panels. The construction materials are, in both cases, secured with appropriate fasteners and/or adhesives to the framing members, sheathing and/or decking of building walls, floors, ceilings and roofs. Such construction materials comprise, without limitation: (a) drywall, gypsum board, plasterboard, cement board, greenboard, blueboard, wood, and foam board for use in forming interior, and in some cases exterior, building walls and/or ceilings; (b) felt paper, underlayments, membranes, wraps, and other similar materials that are generally applied to sheathing and/or decking to protect underlying building materials from the effects of weather, to reduce the amount of air and/or moisture infiltration through a building's structure, and/or to provide insulation against heat and sound transmission; and (c) other similar construction materials. The term "wallboard" is used herein to mean and refer, collectively, to such construction materials.

When individual panels or unrolled rolls of such wallboard are positioned side-by-side in/on a building structure as is often the case, the panels or unrolled rolls define gaps, seams or joints therebetween and are joined together with tape, sealant, filler and/or adhesive substances to form a monolithic structure. The tape may be manufactured from paper, fiberglass, or other material, be woven or non-woven, and be or not be backed with an adhesive substance. The tape is, generally, applied over the gaps, seams or joints either by hand or through use of a taping tool. The sealant, filler and/or adhesive substances may include, but not be limited to, drywall compound, glue, caulk, resin, epoxy, and other similar substances that are collectively referred to herein by the term "mastic". The tape and mastic may be used alone or in combination to seal, fill and/or hide the gaps, seams or joints and secure the individual panels or unrolled rolls together. When the tape and mastic are used in combination to hide a joint between pieces of wallboard, the mastic aids in securing the tape to the wallboard while being featherable away from the joint to cause the joint and tape to blend in and provide a smooth, substantially level surface with the wallboard to either side of the joint.

To apply, screed, smooth and/or feather the mastic relative to a gap, seam, joint, and/or tape, an appropriate finishing tool is selected and used based, at least, on the particular wallboard product, tape, and/or mastic being employed, and the location and orientation of the gap, seam or joint. In situations where the wallboard on both sides of a gap, seam or joint therebetween substantially defines a single plane, a finishing tool known as a "finisher" is often used to quickly apply a thin, uniform layer of mastic over tape covering the gap, seam or joint. A finisher comprises a partial enclosure having a slotted opening in the base thereof and that is filled with mastic. When the base of the finisher is placed in contact with two pieces of wallboard and moved over, for example a joint therebetween taped previously by a user, mastic exits the partial enclosure via the slotted opening, is applied in a layer of desired thickness over the taped joint, and is feathered to cause the tape to blend in with the wallboard on both sides of the taped joint. Typically, a round handle is coupled to the finisher to extend the reach of the user with the finisher and to allow the user to move the finisher over taped joints.

Unfortunately, the finisher may become somewhat heavy when filled with mastic and the finisher's shape/geometry can cause the finisher to become difficult to manipulate. For vertical taped joints, the finisher's weight and shape/geometry are not particularly problematic. However, for horizontal and other non-vertical taped joints, the user must hold the round handle in a non-vertical plane while moving the finisher over the taped joints. Due to the weight and shape/geometry of the finisher, the finisher sometimes becomes difficult to support and keep in appropriate contact with the wallboard while being moved over the horizontal and other non-vertical taped joints. In such circumstances, the finisher exerts a torque on the round handle, tending to twist the handle in the user's hands. In addition, the user may desire to maintain a constant angle between the finisher and handle while moving the finisher over the taped joints in order to apply a uniform layer of mastic and a constant angle may be difficult for the user to maintain. Consequentially, the mastic may not be applied over taped joints in a uniform, consistent manner and the user may be fatigued while attempting to keep the finisher in appropriate contact with the wallboard and at a desired angle relative to the handle.

Therefore, there is a need in the industry for systems, apparatuses, and methods that improve the control and/or usability of finishing tools or other similar devices, that minimize fatigue encountered by users during use of finishing tools or other similar devices, and that may address other problems, difficulties, and/or shortcomings of current technology that may or may not be described herein.

SUMMARY

Briefly described, the present invention comprises a handle system, including apparatuses and methods, for use with finishing tools typically utilized to finish wallboard joints, seams, or gaps. A finishing tool may be connected to the handle system and moved relative to a wallboard joint or seam to apply, screed, smooth, and/or feather mastic to or over the wallboard joint, seam, or gap. Generally, such finishing tools include, but are not limited to, a finisher (sometimes referred to as a "finisher box") for finishing wallboard joints, seams or gaps between pieces of wallboard oriented substantially in a single plane, and a corner finishing tool for finishing wallboard joints, seams or gaps between pieces of wallboard forming a corner.

According to a first example embodiment and without limitation, the handle system is configured for use in a continuous feed finishing tool application in which mastic is supplied, under user control, by a pump or similar device to the handle system for delivery by the handle system to a connected finishing tool. The handle system of the first example embodiment includes an elongate handle body having a cross-sectional shape substantially corresponding to a tear drop. The elongate handle body defines a first channel therein for receiving a brake linkage and a second channel therein for communicating mastic received from the pump or similar device. The handle system further includes a pivoting connector assembly connected to the elongate handle body and connectable to a finishing tool for enabling pivoting motion between the elongate handle body and finishing tool, and for delivering mastic from the elongate handle body to the finishing tool. The pivoting connector assembly includes a pivot pin having a bore therein which enables mastic to flow through the pivoting connector assembly, while also enabling relative rotation between the elongate handle body and the finishing tool. The pivoting connector assembly further includes a connector plate having bores and fasteners cooperative with threaded mounting fasteners of the finishing tool to ensure the proper registration of and assembly between, the finishing tool and the connector plate. Still further, the handle system includes a brake assembly, of which the brake linkage is a part, for controlling the pivoting of the finishing tool relative to the elongate handle body.

Advantageously, the tear drop cross-sectional shape of the elongate handle body fits ergonomically within a user's hand and improves the user's ability to resist torque tending to cause the elongate handle body to twist and a connected finishing tool to come out of contact with wallboard during use of the handle system. The tear drop cross-sectional shape of the elongate handle body is also comfortable to use and minimizes fatigue. Additionally, because the first and second channels of the elongate handle body comprise separate, independent channels with the brake linkage being present and translating within the first channel and mastic flowing through the second channel, operation and movement of the brake linkage is not impaired or effected by the mastic. In addition, by virtue of the bores have a substantially circular cross-section and not comprising slots and by virtue of the bores and fasteners of the connector plate of the pivoting connector assembly being sized and positioned to snugly and threadably receive the threaded mounting fasteners of a finishing tool, the finishing tool is always properly registered and/or oriented relative to the connector plate and, hence, to the elongate handle body, and cannot slip and become improperly oriented.

Other advantages and benefits of the present invention will become apparent upon reading and understanding the present specification when taken in conjunction with the appended drawings.

BRIEF DESCRIPTION OF THE DRAWINGS

FIG. 5 displays a top plan view of the handle body of the handle system of FIG. 1 in accordance with the first example embodiment of the present invention.

FIG. 6 displays a bottom plan view of the handle body of the handle system of FIG. 1 in accordance with the first example embodiment of the present invention.

FIG. 7 displays a right side view of the handle body of the handle system of FIG. 1 in accordance with the first example embodiment of the present invention.

FIG. 8 displays a left side view of the handle body of the handle system of FIG. 1 in accordance with the first example embodiment of the present invention.

DETAILED DESCRIPTION

Figure 1:
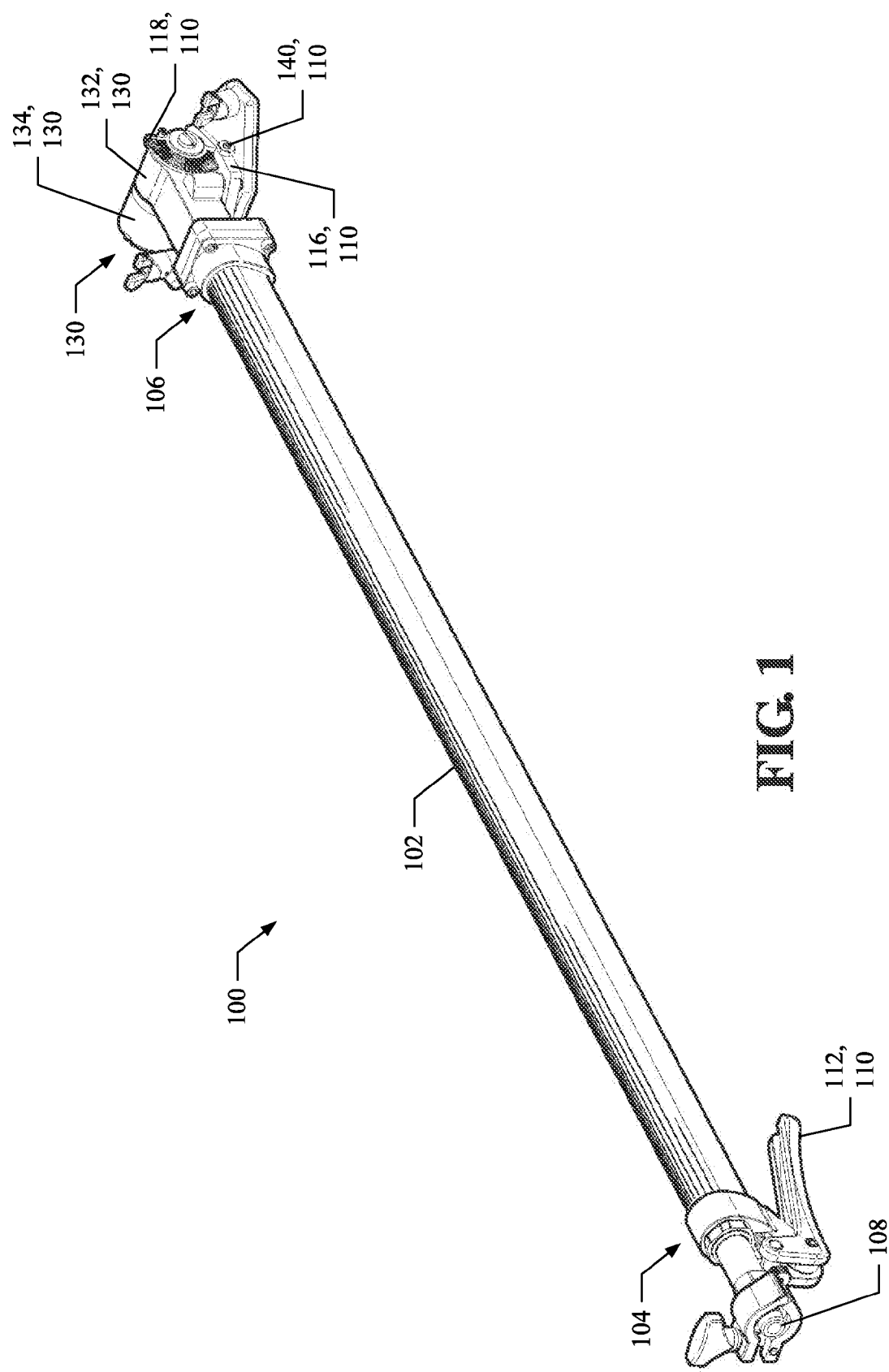
FIG. 1 displays a side perspective view of a handle system for finishing tools in accordance with a first example embodiment of the present invention.

Referring now to the drawings in which like numerals represent like elements or steps throughout the several views, FIG. 1 displays a side perspective view of a handle system 100 for finishing tools in accordance with a first example embodiment. The handle system 100 is adapted for connection to a finisher and/or other finishing tools and enables a user to better control and maintain the finisher and/or other finishing tool in appropriate contact with and position relative to wallboard while applying mastic over joints between pieces of wallboard. The handle system 100 is also configured to maintain a desired angular relationship between the finisher or other finishing tool and a handle body 102 thereof. According to the first example embodiment, the handle system 100 is further adapted to receive a continuous supply of mastic from a pump or other similar device, to direct and channel the mastic through the handle body 102, and to output the mastic to a continuous feed finisher or other finishing tool for subsequent application to wallboard.

The handle system 100, as displayed in FIG. 1, comprises an elongate handle body 102 that is grasped by a user and used to control the orientation and positioning of an attached finisher or other finishing tool during the application of mastic. The handle body 102 has a first end 104 and a second end 106 distant therefrom. The handle body 102, as described in more detail below with reference to FIGS. 4-10, has a non-round, ergonometric shape that permits a user to better resist torque tending to rotate the handle body 102 in his/her hands during use, thereby providing the user with improved control over the handle body 102 and attached finisher or other finishing tool. The ergonometric shape also makes the handle body 102 comfortable to use and tends to minimize fatigue. According to the first example embodiment, the handle body 102 defines first and second internal channels 170, 172 (see FIGS. 4 and 9) extending between the first and second ends 104, 106. The first channel 170 is adapted to receive mastic at the handle body's first end 104, to direct the mastic toward the handle body's second end 106, and to output mastic at the handle body's second end 106. The second channel 172 is configured to receive a brake linkage 114 slidably extending therethrough between the handle body's first and second ends 104, 106.

Coupled and sealed to the first end 104 of the handle body 102, the handle system 100 comprises a fitting 108 that is connectable, and is connected during use, to a hose via which mastic is supplied under pressure to the handle system 100 from a pump or other source. The fitting 108 defines a bore therein that is in fluid communication with the first channel 170 of the handle body 102 and that conveys mastic from a connected hose to the first channel 170 of the handle body 102.

The handle system 100 further comprises a brake assembly 110 that controls and/or maintains the angular orientation of the handle body 102 relative to a finisher or other finishing tool attached to the handle system 100 in response to input from, and as desired by, a user using the handle system 100. The brake assembly 110 includes a brake actuator 112 attached to the handle body 102 at or near the first end 104 thereof. The brake actuator 110 is connected to the brake linkage 114 such that when a user manipulates the brake actuator 110, a force is exerted on the brake linkage 114 causing the brake linkage 114 to slide within the handle body's second channel 172 and convey the force to a brake arm 116 and, ultimately, to a brake disk 118 of the brake assembly 110 that allow and/or restrict angular movement of an attached finisher or other finishing tool relative to the handle body 102 and, hence, to the handle system 100. The brake actuator 110 is movable by a user from a first position in which no force is applied to the brake linkage 114 to a second position in which maximum force is applied to the brake linkage 114. The brake actuator 110 is also movable into a plurality of intermediate positions between the first and second positions in which force corresponding respectively to each intermediate position is applied to the brake linkage 114. According to the first example embodiment, the brake linkage 114 comprises a flexible band, but in other embodiments the brake linkage 114 may comprise a rod, cable, or other member that is capable of transferring a force from the brake actuator 110 to the brake arm 116. Additionally according to the first example embodiment, the brake actuator 110 comprises a lever actuator, but it should be appreciated that the brake actuator 110 may comprise a pushbutton, slidable actuator, twistable actuator, rotatable actuator, or other type of actuator in other embodiments.

The handle system 100 still further comprises a pivoting connector assembly 130 coupled to the handle body 102 at or near the handle body's second end 106. The pivoting connector assembly 130 is adapted for the secure attachment of a finisher or other finishing tool thereto and allows such finisher or other finishing tool to pivot into a plurality of angular orientations relative to a longitudinal axis of the handle body 102. The pivoting connector assembly 130 comprises a coupling portion 132 that attaches to the handle body 102 and a connector portion 134 that attaches to a finisher or other finishing tool. The coupling portion 132, according to the first example embodiment, has a longitudinal axis that is substantially collinear with a longitudinal axis of the handle body 102.

Figure 2:
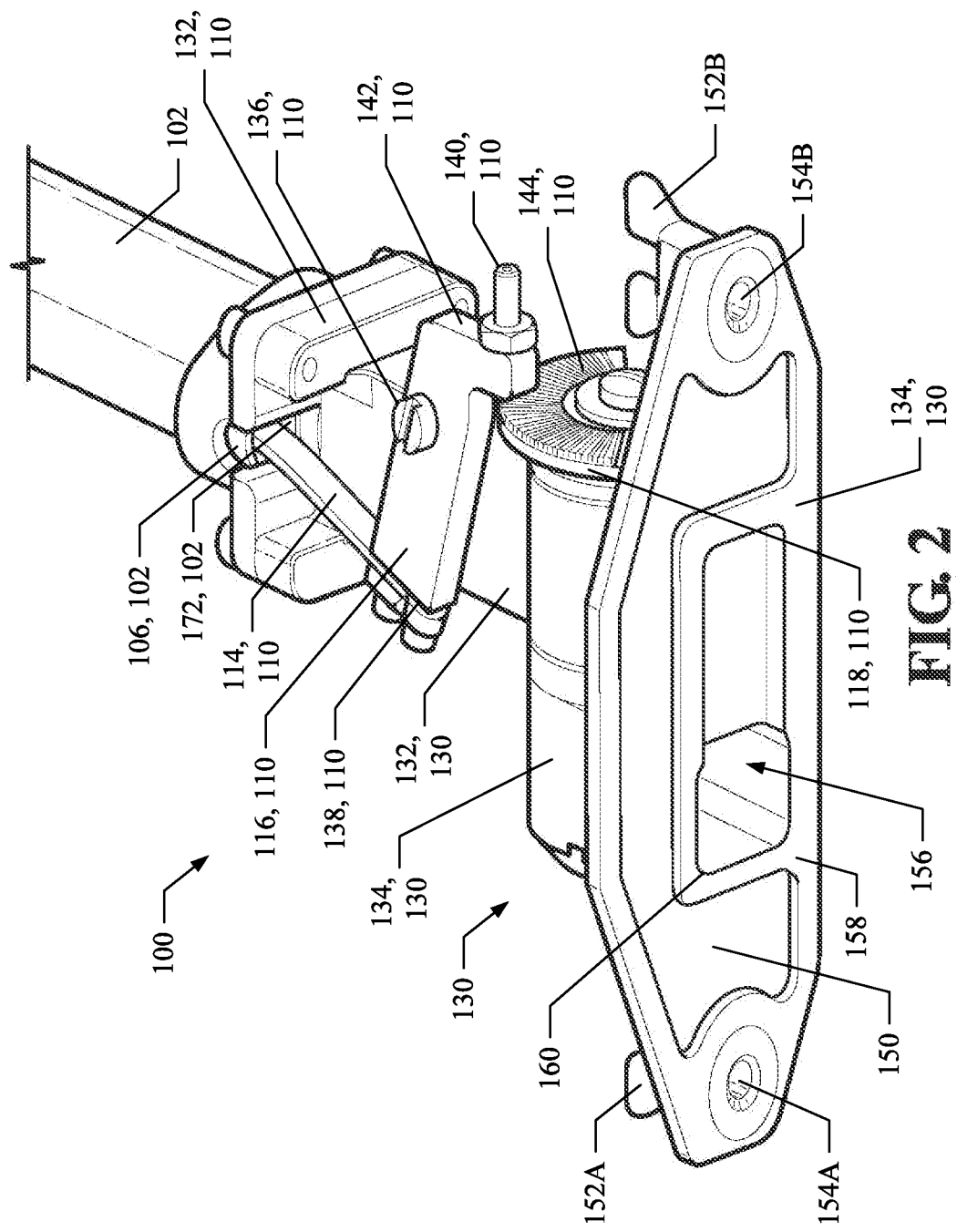
FIG. 2 displays a partial, bottom perspective view of a pivoting connector assembly of the handle system of FIG. 1 in accordance with the first example embodiment of the present invention.

FIG. 2 displays a partial, bottom perspective view of the pivoting connector assembly 130 of the handle system 100 according to the first example embodiment. As seen in FIG. 2, the brake arm 116 is secured to the coupling portion 132 of the pivoting connector assembly 130 by a fastener 136 of the brake assembly 110 that allows the brake arm 116 to rotate about a longitudinal axis of the fastener 136. The brake linkage 114 exits the second channel 172 of the handle body 102 at the handle body's second end 106 and is affixed to a first end 138 of the brake arm 116. The brake assembly 110 further comprises a fastener 140 (such as, but not limited to, a set screw) located at a second end 142 of the brake arm 116 and positioned to contact or engage the brake disk 118 attached to the connector portion 134 of the pivoting connector assembly 130. The brake disk 118 has a plurality of radially-extending ridges 144 that are contacted or engaged by the fastener 140 to restrict or limit movement rotation of the brake disk 118 in response to the application of force to the brake actuator 112 by a user to stop rotational movement of an attached finisher or other finishing tool relative to the handle body 102. When such a force is applied to the brake actuator 112 by squeezing of the brake actuator 112, the brake linkage 114 slides within the handle body's second channel 172 conveying the force to the brake arm 116 and causing the brake arm 116 to rotate about fastener 136. Such rotation brings the fastener 140 into contact or engagement with the radially-extending ridges 144 of the brake disk 118, thereby limiting or preventing rotation of the brake disk 118 and, hence, rotation of an attached finisher or other finishing tool relative to the handle body 102. It should be appreciated that in other embodiments, the brake disk 118 may have a plurality of dimples, a plurality of holes or slots corresponding to different orientations of a finisher or other finishing tool relative to the handle body 102, an abrasive finish, or take on another form in lieu of the radially-extending ridges 144 in order to limit or restrict movement of the finisher or other finishing tool when desired by a user.

The connector portion 134 of the pivoting connector assembly 130, as illustrated in FIG. 2, comprises a connector plate 150 having first and second fasteners 152A, 152B captive thereto. Each fastener 152A, 152B defines a respective bore 154A, 154B for receiving a respective threaded mounting fastener of a finisher or other finishing tool. The fastener 152 and mounting fasteners are positioned so as to allow cooperative mating between the connector plate 150 and a finisher or other finishing tool. Once the mounting fasteners are received within the bores 154 and the fasteners 152 are tightened, the finisher or other finishing tool is appropriately registered relative to the connector plate 150 with very little relative movement or slippage being possible between the connector plate 150 and attached finisher or other finishing tool. According to the first example embodiment, each fastener 152A, 152B comprises a captive wing nut, but may comprise other forms of fasteners in other embodiments.

The connector portion 134 of the pivoting connector assembly 130 defines a channel 156 therein for conveying mastic. The connector plate 150 has a surface 158 that resides in contact with a finisher or other finishing tool when one is attached to the handle system 100. The surface 158 defines an opening 160 therein that is in fluid communication with the channel 156. Each finisher or other finishing tool used with the handle system 100 has an opening therein that is cooperatively located to align with opening 160 of the connector plate 158. During use, mastic flows through the channel 156, out of the connector portion 134 via opening 160, and into the finisher or other finishing tool via the cooperatively located opening of the finisher or other finishing tool.

Figure 3:
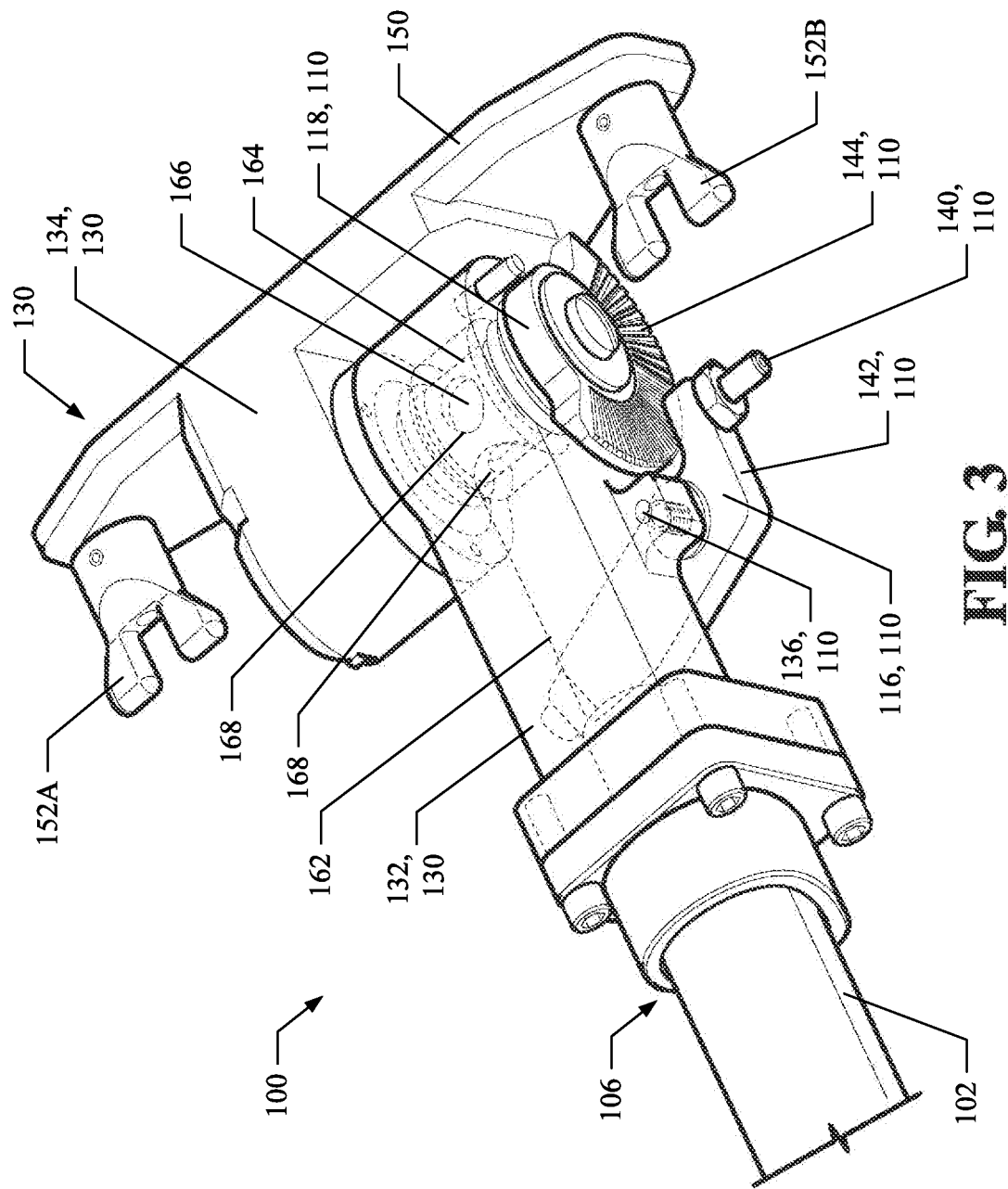
FIG. 3 displays a side perspective view of the pivoting connector assembly of FIG. 2 in accordance with the first example embodiment of the present invention, transparently showing a coupling portion thereof.

FIG. 3 displays a side perspective view of the pivoting connector assembly 130 of the handle system 100, in accordance with the first example embodiment, showing internal features of the coupling portion 132 thereof using hidden lines. The coupling portion 132 defines a bore 162 therein that is in fluid communication with the first channel 170 of the handle body 102 at the second end 106 thereof and is configured to receive mastic from the first channel 170 and to convey the mastic toward a finisher or other finishing tool attached to the handle system 100. As seen in FIG. 3, the connector portion 134 of the pivoting connector assembly 130 further comprises a pivot pin 164 attached to the connector plate 150 and to brake disk 118 such that connector plate 150, pivot pin 164, and brake disk 118 rotate together relative to the coupling portion 132 of the pivoting connector assembly 130. The pivot pin 164 defines a bore 166 therein that is in fluid communication with channel 156 of the connector portion 134 and with the coupling portion's bore 162 via a plurality of holes 168 defined by pivot pin 164. During use, mastic flows from the coupling portion's bore 162, through holes 168 and bore 166, and into the connector portion's channel 156 for subsequent delivery to an attached finisher or other finishing tool via the connector plate's opening 160.

Figure 4:
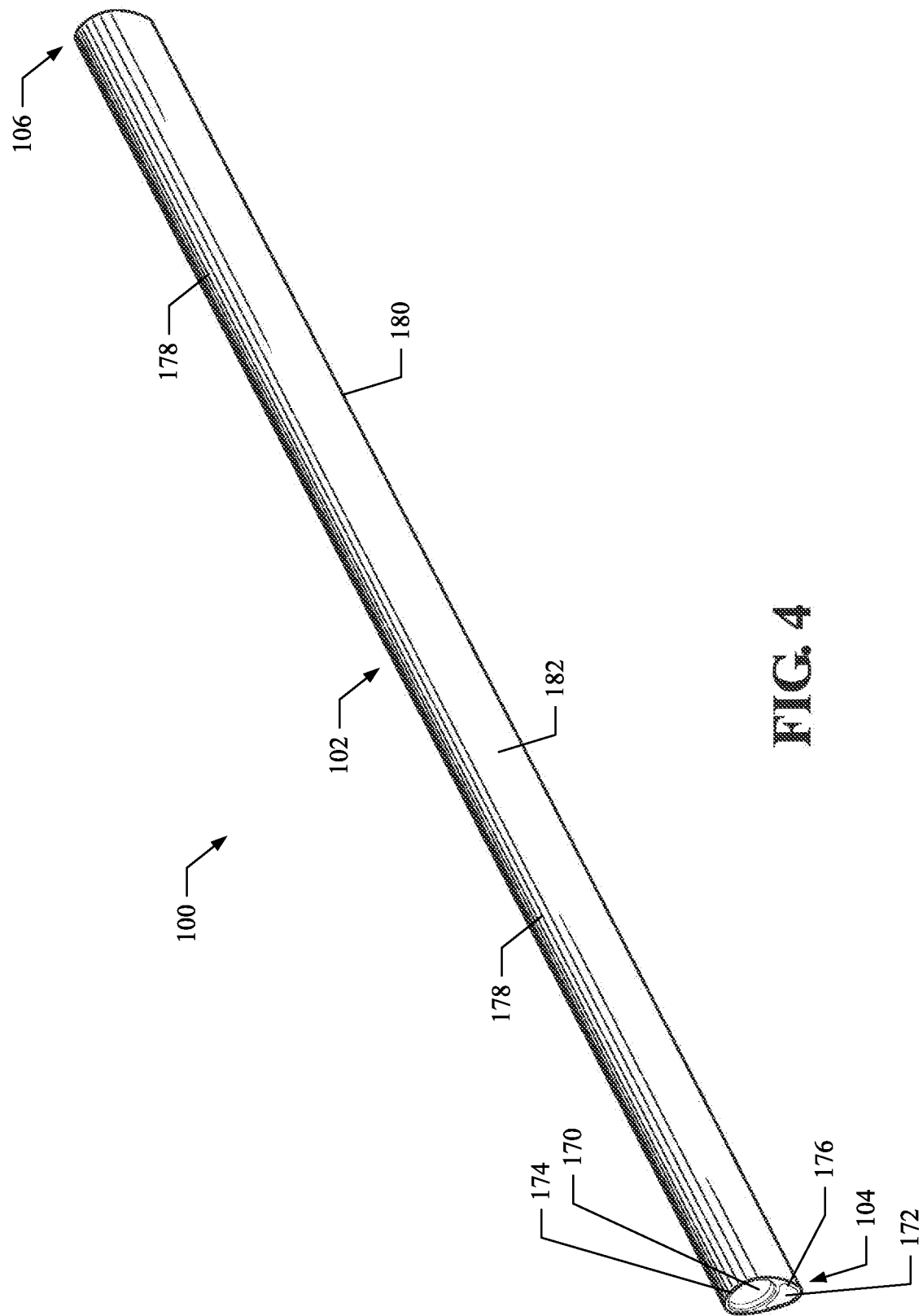
FIG. 4 displays a side perspective view of the handle body of the handle system of FIG. 1 in accordance with the first example embodiment of the present invention.

FIG. 4 displays a side perspective view of the handle body 102 of the handle system 100 in accordance with the first example embodiment. The handle body 102, as described briefly above, extends between first and second ends 104, 106 and has an ergonometric, elongate shape. The handle body 102 defines a first channel 170 extending between the first and second ends 104, 106 that is adapted and appropriately sized and shaped to deliver mastic from the first end 104 to the second end 106 thereof during use of the handle system 100. A second channel 172 is defined by the handle body 102 extending between the first and second ends 104, 106 and appropriately configured for the receipt and sliding of brake linkage 114 therein. At the first end 104, the handle body 102 further defines openings 174, 176 that are in fluid communication, respectively, with the first and second channels 170, 172.

The handle body 102 has a first arcuate surface 178 and an opposed second arcuate surface 180, and a third arcuate surface 182 and an opposed fourth arcuate surface 184. The first and second arcuate surfaces 178, 180 are joined by respective third and fourth arcuate surfaces 182, 184. The first arcuate surface 178 has a radius that is larger then the radius of the second arcuate surface 180, and the third and fourth arcuate surfaces 182, 184 have radii so large as to almost make them appear to be planar surfaces. Collectively, the first, second, third and fourth arcuate surfaces 178, 180, 182, 184 give the handle body 102 a substantially tear drop profile when viewed in an end or sectional view. The radii of the first and second arcuate surfaces 178, 180 are selected so that the first arcuate surface 178 fits comfortably within the palm of a user's hand and the second arcuate surface 180 fits comfortably within a user's folded fingers. The third and fourth arcuate surfaces 182, 184 enable a user to use his/her thumbs or other portions of his/her hand to exert forces on the handle body 102 tending to avoid twisting or rotation of the handle body 102 within his/her hands during use of the handle system 100 with a finisher or other finishing tool that may occur when applying mastic to joints between pieces of wallboard.

FIGS. 5, 6, 7 and 8 respectively display top plan, bottom plan, right side elevational, and left side elevational views of the handle body 102 of the handle system 100 in accordance with the first example embodiment. As seen in FIG. 5, the first arcuate surface 178 extends between arcuate surfaces 182, 184 and between ends 104, 106. The second arcuate surface 180, as seen in FIG. 6, extends between arcuate surfaces 182, 184 and between ends 104, 106. As illustrated in FIG. 7, the first arcuate surface 182 extends between arcuate surfaces 178, 180 and between ends 104, 106. The second arcuate surface 184, as seen in FIG. 8, extends between arcuate surfaces 178, 180 and between ends 104, 106.

Figure 9:
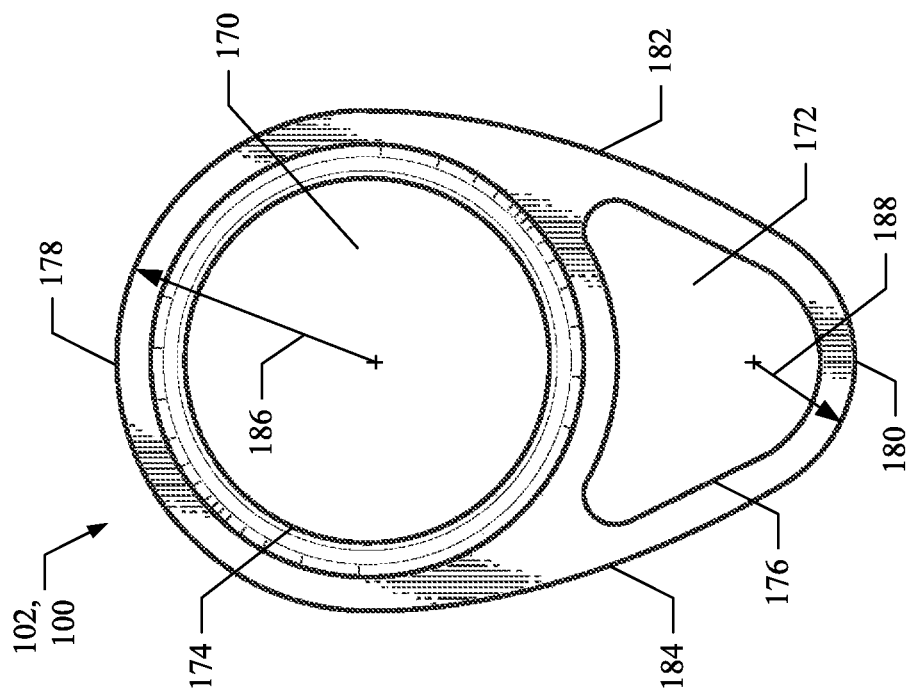
FIG. 9 displays an end elevational view of the first end of the handle body of the handle system of FIG. 1 in accordance with the first example embodiment of the present invention.

FIG. 9 displays an end elevational view of the first end 104 of the handle body 102 of the handle system 100, in accordance with the first example embodiment. As seen more clearly in FIG. 9, the first arcuate surface 178 of the handle body 102 is opposed to the second arcuate surface 180. The first arcuate surface 178 has a radius 186 that, as briefly described above, is larger than the radius 188 of the second arcuate surface 180. As also briefly described above, the first and second arcuate surfaces 182, 184 extend between the first and second arcuate surfaces 178, 180. Additionally, the first and second channels 170, 172 and first and second openings 174, 176 in fluid communication with the first and second channels 170, 172 are clearly visible.

Figure 10:
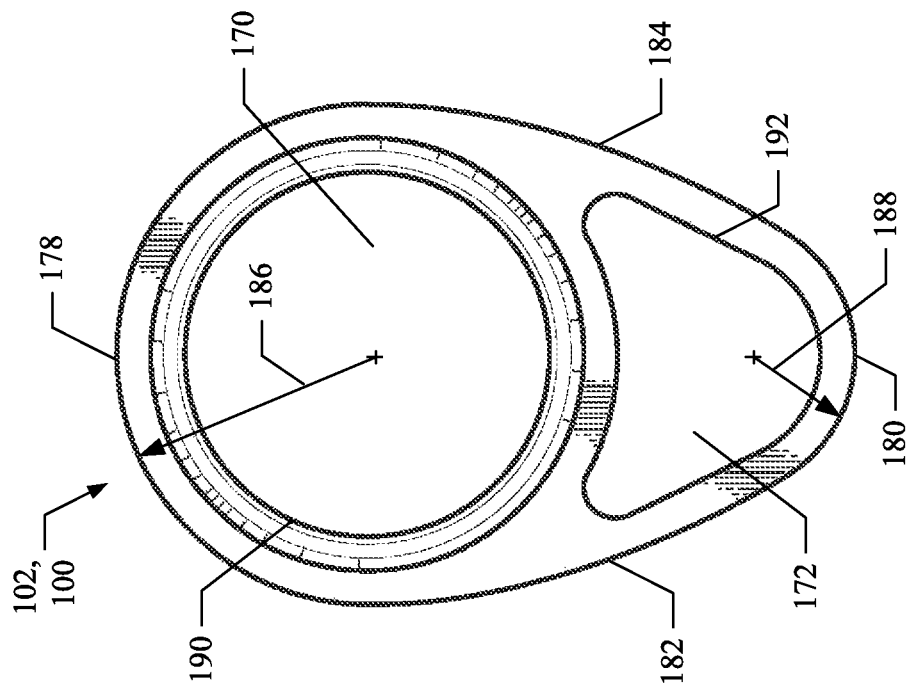
FIG. 10 displays an end elevational view of the second end of the handle body of the handle system of FIG. 1 in accordance with the first example embodiment of the present invention.

FIG. 10 displays an end elevational view of the second end 106 of the handle body 102 of the handle system 100 according to the first example embodiment. The second end 106 of the handle body 102 is more clearly visible in FIG. 10 with the first and second arcuate surfaces 178, 180, radii 186, 188, and first and second arcuate surfaces 182, 184 being seen. At the second end 106, the handle body 102 further defines openings 190, 192 that are in fluid communication, respectively, with the first and second channels 170, 172.

Figure 11:
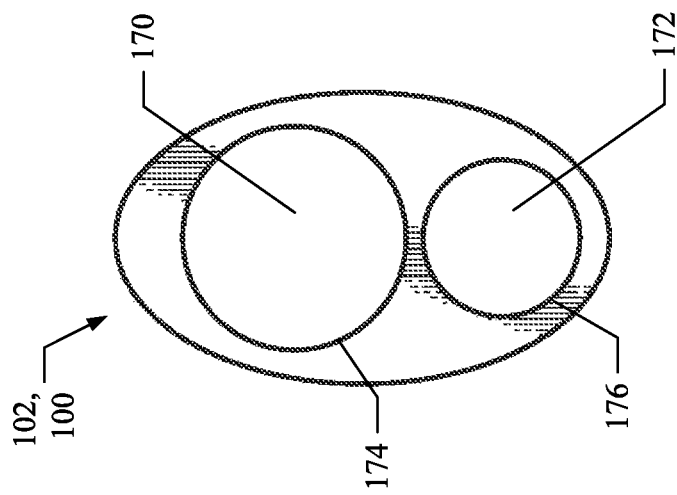
FIG. 11 displays an end elevational view of a handle body of a handle system for finishing tools in accordance with a second example embodiment of the present invention.

FIG. 11 displays an end elevational view of a handle body 102 of a handle system 100 for finishing tools in accordance with a second example embodiment. The handle system 100 of the second example embodiment is substantially similar to the handle system 100 of the first example embodiment with the exception that the handle body 102 of the second example embodiment has an oval, or elliptical, profile when viewed in an end or cross-sectional view. Similar to the handle body 102 of the first example embodiment, the handle body 102 of the second example embodiment defines first and second channels 170, 172 extending between the first and second ends 104, 106 of the handle body 102. At the first end 104 and as seen in FIG. 11, the handle body 102 of the second example embodiment defines first and second openings 174, 176 that are in fluid communication, respectively, with the first and second channels 170, 172. At the second end 106, the handle body 102 of the second example embodiment similarly defines openings (not visible) that are in fluid communication with the first and second channels 170, 172.

Figure 12:
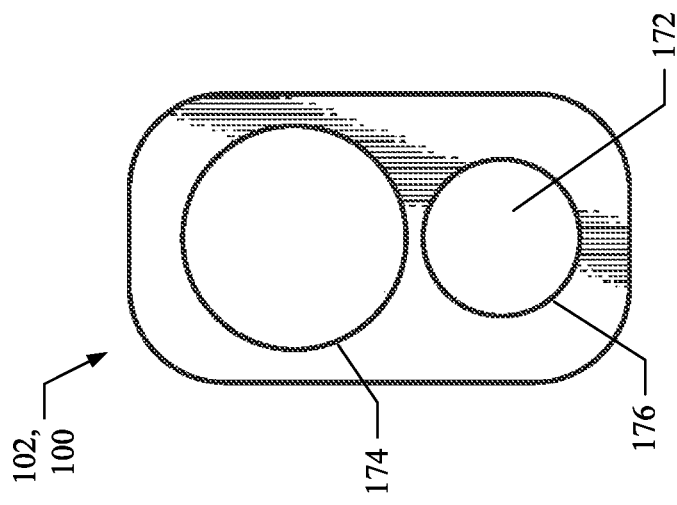
FIG. 12 displays an end elevational view of a handle body of a handle system for finishing tools in accordance with a third example embodiment of the present invention.

FIG. 12 displays an end elevational view of a handle body 102 of a handle system 100 for finishing tools according to a third example embodiment. The handle system 100 of the third example embodiment is substantially similar to the handle system 100 of the first example embodiment with the exception that the handle body 102 of the third example embodiment has a rectangular profile with rounded, or radiused, corners when viewed in an end or cross-sectional view. Similar to the handle body 102 of the first example embodiment, the handle body 102 of the third example embodiment defines first and second channels 170, 172 extending between the first and second ends 104, 106 of the handle body 102. At the first end 104 and as seen in FIG. 12, the handle body 102 of the third example embodiment defines first and second openings 174, 176 that are in fluid communication, respectively, with the first and second channels 170, 172. At the second end 106, the handle body 102 of the third example embodiment similarly defines openings (not visible) that are in fluid communication with the first and second channels 170, 172.

Figure 13:
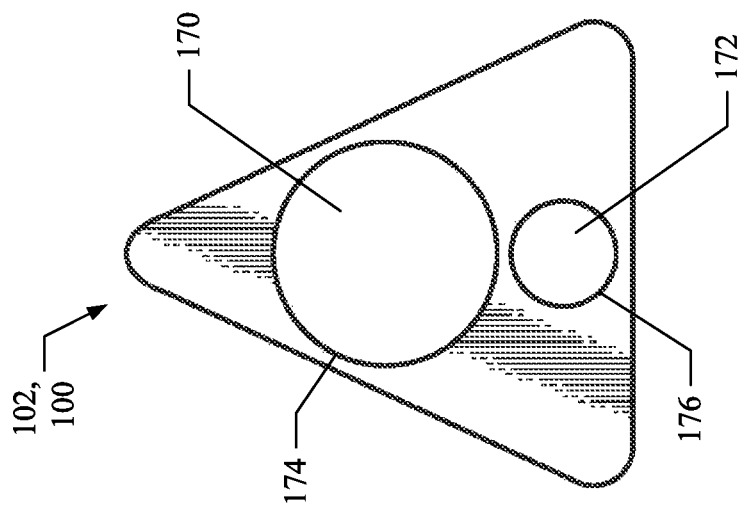
FIG. 13 displays an end elevational view of a handle body of a handle system for finishing tools in accordance with a fourth example embodiment of the present invention.

FIG. 13 displays an end elevational view of a handle body 102 of a handle system 100 for finishing tools according to a fourth example embodiment. The handle system 100 of the fourth example embodiment is substantially similar to the handle system 100 of the first example embodiment with the exception that the handle body 102 of the fourth example embodiment has a triangular profile with rounded, or radiused, apexes or vertices when viewed in an end or cross-sectional view. Similar to the handle body 102 of the first example embodiment, the handle body 102 of the fourth example embodiment defines first and second channels 170, 172 extending between the first and second ends 104, 106 of the handle body 102. At the first end 104 and as seen in FIG. 12, the handle body 102 of the fourth example embodiment defines first and second openings 174, 176 that are in fluid communication, respectively, with the first and second channels 170, 172. At the second end 106, the handle body 102 of the fourth example embodiment similarly defines openings (not visible) that are in fluid communication with the first and second channels 170, 172.

Figure 14:
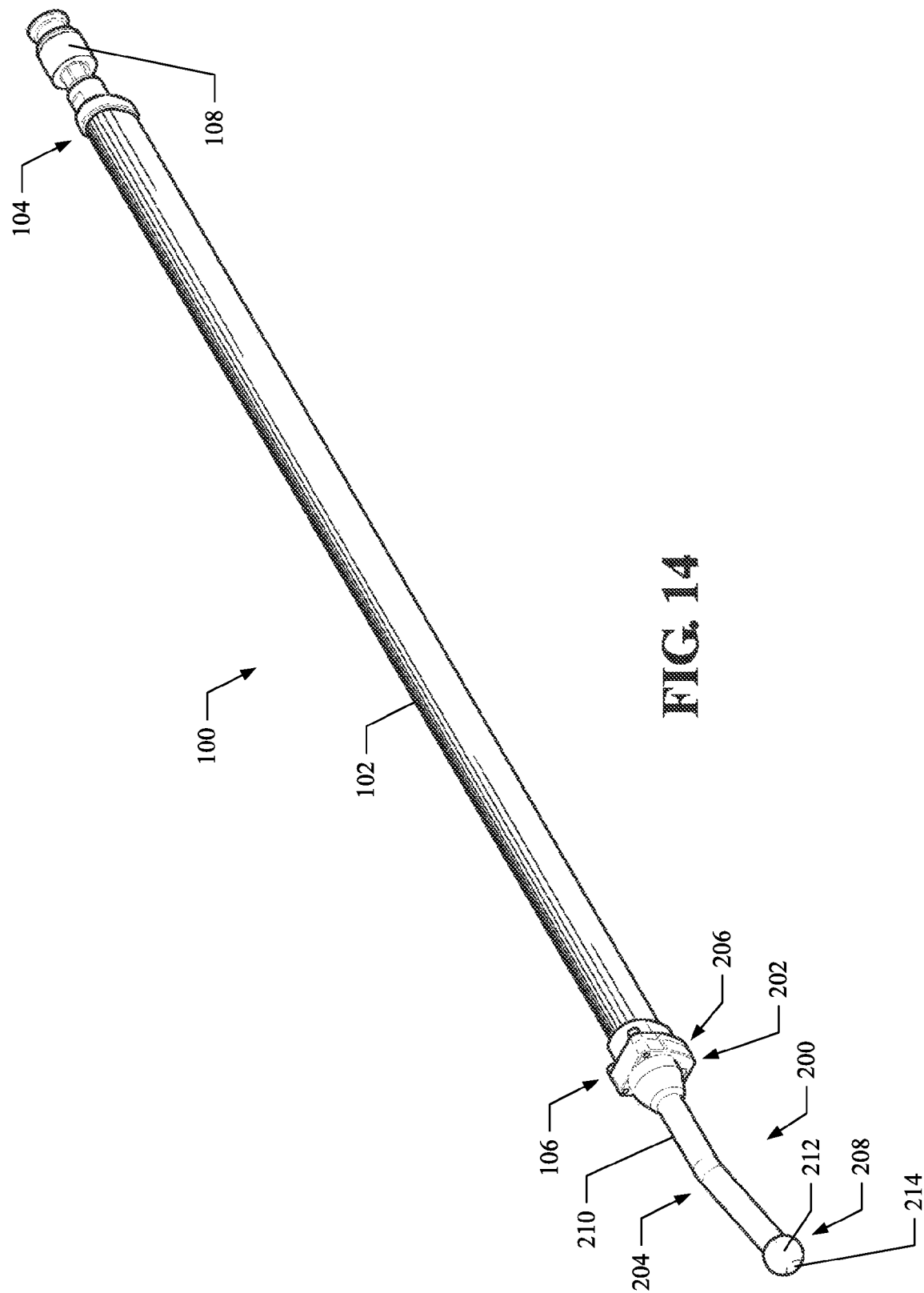
FIG. 14 displays a side perspective view of a handle system for finishing tools in accordance with a fifth example embodiment of the present invention.

FIG. 14 displays a side perspective view of a handle system 100 for finishing tools in accordance with a fifth example embodiment. The handle system 100 is adapted for connection to a corner finishing tool and/or other finishing tools and allows a user to apply mastic over joints between wallboard members forming an inside corner. According to the fifth example embodiment, the handle system 100 is further adapted to receive a continuous supply of mastic from a pump or other similar device, to direct and channel the mastic through the handle body 102, and to output the mastic to a continuous flow corner finishing tool or other finishing tool for subsequent application to wallboard.

The handle body 102 of the fifth example embodiment is substantially similar to the handle body 102 of the first example embodiment described above. The handle body 102 is grasped by a user and used to control the orientation and positioning of an attached corner finishing tool or other finishing tool during the application of mastic. The handle body 102 has a first end 104 and a second end 106 distant therefrom. The handle body 102 has a non-round, ergonometric shape that permits a user to better resist torque tending to rotate the handle body 102 in his/her hands during use, thereby providing the user with improved control over the handle body 102 and attached corner finishing tool or other finishing tool. The ergonometric shape is also more comfortable to use. More particularly, the handle body 102 has a generally tear drop profile, or shape, when viewed from the first or second end 104, 106 or in a sectional view. First and second internal channels 170, 172 are defined by the handle body 102 extending between the first and second ends 104, 106. The first channel 170 is adapted to receive mastic at the handle body's first end 104, to direct the mastic toward the handle body's second end 106, and to output mastic at the handle body's second end 106. The second channel 172 is configured to receive a brake linkage 114 slidably extending therethrough between the handle body's first and second ends 104, 106 as may be necessary or required for using certain finishing tools with the handle body 102. For example, when a corner finishing tool is used with the handle system 100, no brake linkage 114 is present within the second channel 172 since a corner finishing tool does not utilize a brake.

Similar to the handle system 100 of the first example embodiment, the handle system 100 of the fifth example embodiment comprises a fitting 108 coupled and sealed to the first end 104 of the handle body 102. The fitting 108 is connectable, and is connected during use, to a hose via which mastic is supplied under pressure to the handle system 100 from a pump or other source. The fitting 108 defines a bore therein that is in fluid communication with the first channel 170 of the handle body 102 and that conveys mastic from a connected hose to the first channel of the handle body 102.

The handle system 100 of the fifth example embodiment further comprises an adapter assembly 200 coupled to the handle body 102 at or near the handle body's second end 106. The adapter assembly 200 is configured for the secure attachment of a corner finishing tool or other finishing tool thereto and allows such corner finishing tool or other finishing tool to pivot into a plurality of positions relative to the handle body 102. The adapter assembly 200 comprises a coupling portion 202 that attaches to the handle body 102 and a connector portion 204 that attaches to a corner finishing tool or other finishing tool. The coupling portion 202, according to the fifth example embodiment, has a longitudinal axis that is substantially collinear with a longitudinal axis of the handle body 102. An internal passage defined with the adapter assembly 200 and extending between the first and second ends 206, 208 thereof is in fluid communication with the handle body's first channel 170. During use of the handle system 100 of the fifth example embodiment, the internal passage receives mastic from the handle body's first channel 170 at the handle body's second end 106 and directs the mastic through the adapter assembly's internal passage between the first and second ends 206, 208 thereof.

The connector portion 204 has body portion 210 having a slight bend therein that enhances a user's ability to apply appropriate force to an attached corner finishing tool or other finishing tool during use. The connector portion 204 also has a pivot ball 212 located at the second end 208 of the adapter assembly 200. The pivot ball 212 is received by an attached corner finishing tool or other finishing tool to secure the corner finishing tool or other finishing tool, as the case may be, to the handle system 100 and allows an attached tool to pivot into a plurality of different positions relative to the connector portion 204 of the handle system 100. The pivot ball 212 defines an opening 214 therein that is in fluid communication with the internal passage of the adapter assembly 200 and that allows mastic to exit the adapter assembly's internal passage into an attached corner finishing tool or other finishing tool.

It should be appreciated that while the handle system 100 of the various example embodiments has been described herein as providing a continuous flow of mastic to an attached finisher, corner finishing tool, or other finishing tool, the handle system 100 may be used with attached finishers or other finishing tools that are not designed to receive a continuous flow of mastic. It should be also appreciated that while the handle system 100 of the various example embodiments has been described herein as being configured to apply a braking force to limit or restrict the movement of an attached finisher or other finishing tool relative to the handle body 102, the handle system 100 may be used with attached finishers, corner finishing tools, or other finishing tools that do not require limitation or restriction of movement relative to the handle body 102. Additionally, it should be appreciated that in other example embodiments in which the handle system 100 need not deliver a continuous flow of mastic to or limit the movement of an attached finisher or other finishing tool, the handle body 102 of such example embodiments may not define a first internal channel 170 for the flow of mastic therethrough, may have no fitting 108 present at the first end 104 thereof, and may not define a second internal channel 172 for the passage of a brake linkage 114 therethrough. In addition, it should be appreciated that while the handle system 100 of the various example embodiments has been described herein with respect to finishing wallboard, the handle system 100 may be employed in connection with finishing other building materials and with other tools for finishing other building materials.

Whereas the present invention is described in detail with respect to the example embodiments, it should be understood that variations and modifications may be effected within the spirit and scope of the present invention, as described herein before and as defined in the appended claims.

What is claimed is:

1. A handle system for finishing tools used to finish wallboard, said handle system comprising:

an elongate handle body that guides mastic therethrough and has a cross-sectional shape where grasped during use, the cross sectional shape corresponding substantially to the shape of a tear drop; and a pivoting connector assembly pivotably connected to said elongate handle body for connection to a finishing tool, said pivoting connector assembly defining an internal path therethrough in fluid communication with said elongate handle body and with the connected finishing tool for allowing the mastic to flow from said elongate handle body to the connected finishing tool.

2. The handle system of claim 1, wherein said elongate handle body defines a first channel therein for movably receiving a brake linkage for controlling pivoting of said pivoting connector assembly.

3. The handle system of claim 2, wherein said elongate handle body has a first end and a second end distant therefrom, and said elongate handle body further defines a second channel through which the mastic to flows within said elongate handle body between said first end and said second end of said elongate handle body.

4. The handle system of claim 1, wherein said pivoting connector assembly includes a first portion connected in a stationary relationship to said elongate handle body and a second portion pivotally connected to said first portion.

5. The handle system of claim 4, wherein said first portion of said pivoting connector assembly defines a first channel therein for allowing the mastic to flow therethrough and said second portion of said pivoting connector assembly defines a second channel therein for allowing the mastic to flow therethrough, and wherein said pivoting connector assembly further includes a pivot pin for enabling relative rotary motion between said first portion and said second portion of said pivoting connector and for allowing the mastic to flow between said first channel and said second channel.

6. The handle system of claim 1, wherein said pivoting connector assembly defines a pair of bores therein and includes a pair of fasteners coaxially aligned respectively with said pair of bores for respectively receiving a cooperative pair of mounting fasteners of a finishing tool and registering the finishing tool in proper orientation relative to said pivoting connector assembly.

7. A handle system for finishing tools used to finish wallboard, said handle system comprising:

a brake assembly for controlling the position of a finishing tool, said brake assembly including a brake actuator for receiving user input and a brake linkage operative with said brake actuator, said brake linkage controlling pivoting of a connected finishing tool relative to said elongate handle body in response to user input;

an elongate handle body defining a first channel therein for movably receiving said brake linkage therein and a second channel therein for allowing mastic to flow within said elongate handle body; and a pivoting connector assembly pivotably secured to said elongate handle body for connection to a finishing tool, said pivoting connector assembly defining an internal fluid communication path therethrough in fluid communication with said second channel of said elongate handle body and with a connected finishing tool, the internal fluid communication path allowing the mastic to flow from said elongate handle body and into the connected finishing tool.

8. The handle system of claim 7, wherein said elongate handle body has a substantially tear drop cross-sectional shape.

9. The handle system of claim 7, wherein said elongate handle body has a substantially oval cross-sectional shape.

10. The handle system of claim 7, wherein said elongate handle body has a substantially rectangular cross-sectional shape having radiused corners.

11. The handle system of claim 7, wherein said elongate handle body has a substantially triangular cross-sectional shape having radiused vertices.

12. The handle system of claim 7, wherein said brake linkage comprises a band.

13. The handle system of claim 7, wherein said brake linkage comprises a cable.

14. The handle system of claim 7, wherein said brake linkage comprises a rod.

15. The handle system of claim 7, wherein said brake assembly further includes a brake disk configured to move in unison with the connected finishing tool and a member adapted to engage and disengage said brake disk in response to user input to control movement of said brake disk and the connected finishing tool.

16. The handle system of claim 3, wherein the elongate handle includes a first end having a first opening and a second opening and a second end having a first opening and a second opening, the first channel extending between the first opening in the first end and the first opening in the second end, the second channel extending between the second opening in the first end and the second opening in the second end.

17. The handle system of claim 7, wherein the elongate handle includes a first end having a first opening and a second opening and a second end having a first opening and a second opening, the first channel extending between the first opening in the first end and the first opening in the second end, the second channel extending between the second opening in the first end and the second opening in the second end.

* * * * *